(No Model.)
A. L. BOYER.
HANDLE FOR HOES, RAKES, &c.
No. 603,550.  Patented May 3, 1898.
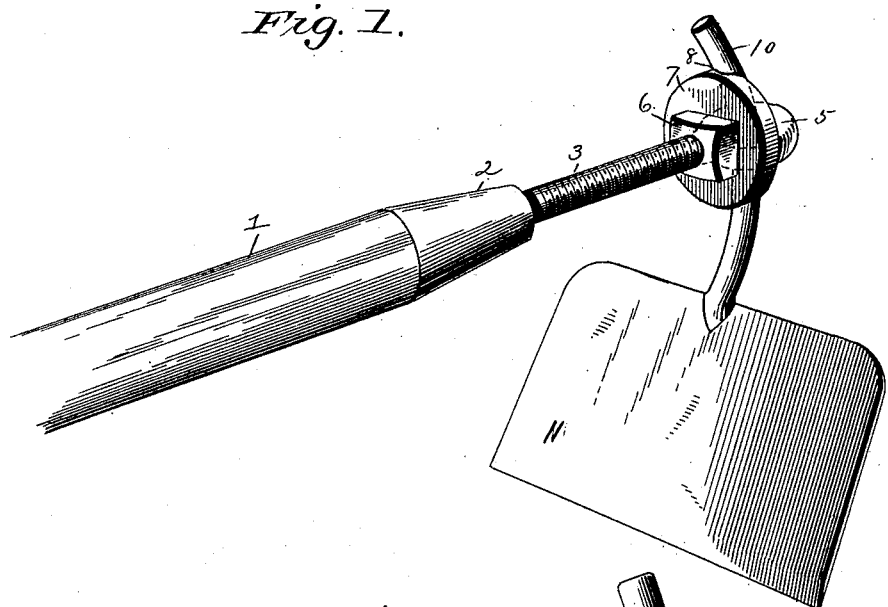
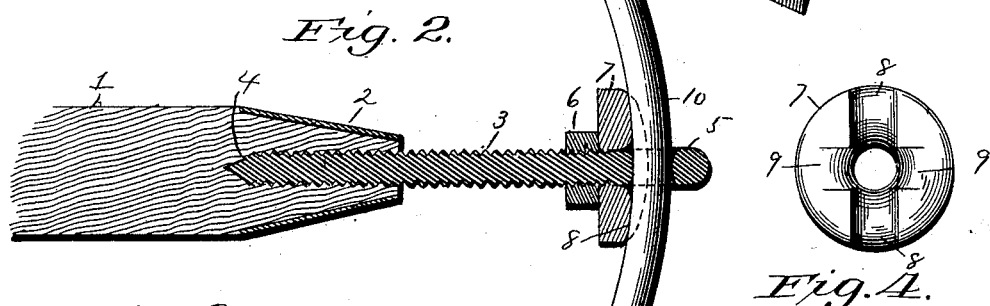
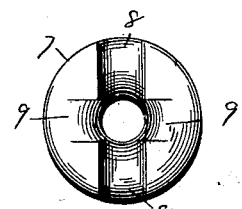
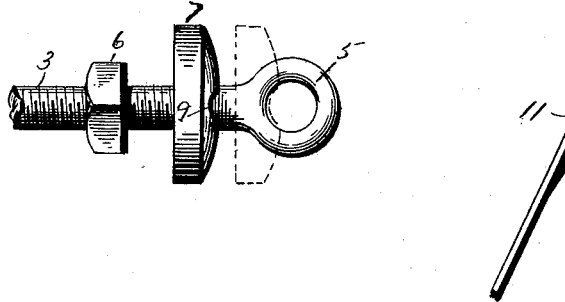
Witnesses
L. C. Hills
G. E. Warner
Inventor
Albert L. Boyer
By Glascock &c.
Attorneys

UNITED STATES PATENT OFFICE.

ALBERT LYNN BOYER, OF OTTO, INDIANA.

HANDLE FOR HOES, RAKES, &c.

SPECIFICATION forming part of Letters Patent No. 603,550, dated May 3, 1898.

Application filed September 27, 1897. Serial No. 653,205. (No model.)

*To all whom it may concern:*

Be it known that I, ALBERT LYNN BOYER, a citizen of the United States, residing at Otto, in the county of Clark and State of Indiana, have invented certain new and useful Improvements in Handles for Hoes, Rakes, &c.; and I do hereby declare the following to be a full, clear, and exact description of the invention, such as will enable others skilled in the art to which it appertains to make and use the same.

My invention has relation to handles for hoes, rakes, &c.; and it consists in the novel construction and arrangement of its parts, as hereinafter described.

The object of the invention is to provide a handle to which the hoe or rake may be secured at any desired slant or angle, the handle being so constructed as to receive either a hoe or a rake or other like implement, the implement being provided with a curved shank adapted to enter an eye at the end of the handle.

In the accompanying drawings, Figure 1 is a perspective view of the lower end of the handle, showing a hoe attached in place. Fig. 2 is a sectional view of the lower end of the handle, showing the hoe located therein. Fig. 3 is a top plan view of the pin located at the end of the handle. Fig. 4 is an elevation of a washer used on said pin.

The handle 1 is provided at its lower end with a ferrule 2. The pin 3 is externally threaded and is pointed at its inner end 4. At the other end of said pin the eye 5 is formed. The nut 6 is adapted to work on the threaded exterior of the pin 3, and the washer 7 is located on said pin. The outer face of said washer is provided with the perpendicular recesses 8 8, extending radially across the face, and the horizontal recesses 9 9, also extending radially across the face. The recesses 8 8 are adapted to bear against the inner side of the curved shank 10 of the hoe or rake 11, and the recesses 9 9 are adapted to receive the outer sides 5 when the washer 7 is impinged against the shank 10, as shown in Fig. 2. The washer 7 may be elliptical in shape. The nut 6 is adapted to hold the washer 7 in position against the shank 10, the said shank passing through the eye 5, and thus the said shank is impinged in the said eye.

It is obvious that by loosening the nut 6 and slipping the washer 7 slightly back the shank 10 is free to move within the eye, and as the said shank is curved, as shown in Fig. 2, by moving the said shank up or down in the eye the slant or angle of the hoe or rake 11 relative to the longitudinal axis of the handle 1 may be varied or regulated. When the rake or hoe 4 is at the proper slant, by revolving the nut 6 the washer 7 is brought in engagement with the shank 10, and thus the shank is secured in its proper position.

It is also obvious that a rake may be substituted for a hoe in connection with a handle provided with a pin and eye, as described. The same movement on the pin 3 that operates in the perforation of the nut 6 can be employed to secure the said pin 3 in the handle 1, the said pin being pointed at the end 4, and thus being adapted to force its way into the handle, the ferrule 2 preventing tilting of the handle.

Having thus described my invention, what I claim as new, and desire to secure by Letters Patent, is—

1. In a handle for hoes, rakes, &c., a pin located at the end of the handle, an eye formed at the end of said pin, a washer located on the pin, a nut located on the pin behind the washer, said washer having on its outer face horizontal recesses adapted to receive the sides of the eye and perpendicular recesses, the hoe or rake having a shank adapted to pass through said eye, the perpendicular recesses of the washer adapted to come in contact with said shank and impinge the shank in the eye.

2. In a handle for hoes, rakes, &c., a pin fixed to the end of the handle, an eye located at the end of the pin, said pin being externally threaded, a washer located on the pin, a nut located on the pin behind the washer, said washer having in its outer face horizontal recesses adapted to receive the sides of the eye and perpendicular recesses, the hoe or rake having a curved shank, said shank adapted to pass through said eye, the recesses of the washer adapted to receive said shank and impinge the shank in the eye.

In testimony whereof I affix my signature in presence of two witnesses.

ALBERT LYNN BOYER.

Witnesses:
WILLIAM M. SMITH,
WILLIAM H. BOYER.